(12) United States Patent
Lengsfeld et al.

(10) Patent No.: US 12,330,641 B2
(45) Date of Patent: Jun. 17, 2025

(54) METHOD USED FOR DERIVING A CONTROL VARIABLE FOR LATERAL GUIDANCE OF A MOTOR VEHICLE

(71) Applicant: Robert Bosch GmbH, Stuttgart (DE)

(72) Inventors: Alexander Lengsfeld, Bad Muender (DE); Philip Lenz, Holle (DE)

(73) Assignee: ROBERT BOSCH GMBH, Stuttgart (DE)

( * ) Notice: Subject to any disclaimer, the term of this patent is extended or adjusted under 35 U.S.C. 154(b) by 254 days.

(21) Appl. No.: 18/151,826

(22) Filed: Jan. 9, 2023

(65) Prior Publication Data
US 2023/0227035 A1     Jul. 20, 2023

(30) Foreign Application Priority Data

Jan. 14, 2022  (DE) ...................... 10 2022 200 409.4

(51) Int. Cl.
| | |
|---|---|
| *B60W 30/12* | (2020.01) |
| *B60W 40/072* | (2012.01) |
| *B60W 50/00* | (2006.01) |
| *G06V 20/56* | (2022.01) |

(52) U.S. Cl.
CPC .......... *B60W 30/12* (2013.01); *B60W 40/072* (2013.01); *B60W 50/00* (2013.01); *G06V 20/588* (2022.01); *B60W 2050/0031* (2013.01); *B60W 2420/403* (2013.01); *B60W 2552/30* (2020.02); *B60W 2552/53* (2020.02)

(58) Field of Classification Search
CPC ......... B60W 30/12; B60W 2050/0031; B60W 2050/0033; B60W 2050/0034; B60W 2420/403; B60W 2552/30; B60W 2552/53; B60W 30/10; B60K 28/00–165; G05D 1/0061; G05D 1/0088; G05D 1/021; G05D 1/0214; G05D 1/0221; G05D 1/0223; G06T 7/20–277; G06T 2207/30241; G06T 2207/30244; B62D 1/28; B62D 1/283; B62D 15/02; B62D 15/025–0265

See application file for complete search history.

(56) References Cited

FOREIGN PATENT DOCUMENTS

CN           109624851 A  *  4/2019  ............... B60R 1/00

* cited by examiner

*Primary Examiner* — Mark L. Greene
(74) *Attorney, Agent, or Firm* — NORTON ROSE FULBRIGHT US LLP

(57) ABSTRACT

A method used for deriving a control variable for lateral guidance of a motor vehicle by means of images of at least one camera of the motor vehicle, wherein the at least one camera captures images of a roadway. A more precise and/or resource-saving derivation of the control variable, and thus lateral guidance, of the motor vehicle is achieved by projecting a traffic lane to be followed as well as a travel trajectory of the motor vehicle onto the images, and by a control variable for lateral guidance of the motor vehicle being derived by comparing the traffic lane projected onto the images with the travel trajectory projected onto the images. A motor vehicle in which the method is performed is also described.

10 Claims, 2 Drawing Sheets

METHOD USED FOR DERIVING A CONTROL VARIABLE FOR LATERAL GUIDANCE OF A MOTOR VEHICLE

CROSS REFERENCE

The present application claims the benefit under 35 U.S.C. § 119 of German Patent Application No. DE 10 2022 200 409.4 filed on Jan. 14, 2022, which is expressly incorporated herein by reference in its entirety.

FIELD

The present invention relates to a method used for deriving a control variable for lateral guidance of a motor vehicle by means of images from at least one camera of the motor vehicle. The present invention further relates to a computer program product configured to perform the method. The present invention also relates to a motor vehicle having at least one camera and a control device for performing the method.

BACKGROUND INFORMATION

Vehicle assistance systems and the semi-autonomous driving of a motor vehicle require monitoring the environment of the motor vehicle. In this context, there is an interest in identifying a traffic lane of a roadway to be followed. To this end, motor vehicles typically feature a camera that captures images of an upcoming course of a roadway. Typically, road markings are recognized in the images in order to determine a traffic lane to be followed. This traffic lane is usually then projected back into a coordinate system with global coordinates. By means of these images, a control variable used for lateral guidance of the motor vehicle can also be derived. To this end, the coordinate system typically associates the projected traffic lane with the traffic lane markings in order to derive a control variable for lateral guidance of the vehicle.

SUMMARY

An object of the present invention is to provide improved or at least other embodiments for a method used for deriving a control variable for lateral guidance of a motor vehicle by means of images from at least one camera of the motor vehicle, for a computer program product used for performing the method, as well as for a motor vehicle in which the method is performed, which embodiments specifically eliminate disadvantages of solutions of the prior art. In particular, the present invention relates to the task of specifying embodiments for the method, for the computer program product, and for the motor vehicle, which embodiments are characterized by a more precise and/or more resource-saving derivation of the control variable and thus of the lateral control.

According to the present invention, this object may be achieved by features of the present invention. Example advantageous embodiments of the present invention are disclosed herein.

The present invention is based on the general idea of deriving, by means of images from at least one camera of a motor vehicle, a control variable for lateral guidance from the native measurement space of the camera, and thus from the images from the camera. Doing so eliminates the need for projections or mappings between data originating from the images and a coordinate system, in particular a global coordinate system. In this context, the present invention uses the knowledge that the projections between the images and the coordinate system each require at least one transformation. Given that such transformations typically depend on different parameters, e.g., the shape of the road, the transformations and the corresponding projections present a non-trivial problem, which can lead to corresponding losses of accuracy. The omission of such transformations and the associated accuracy losses then leads to a more accurate derivation of control variables for lateral guidance and consequently to a more accurate lateral guidance of the motor vehicle and/or to a reduction in required resources. This is particularly true at an increasing distance from the motor vehicle, because the aforementioned accuracy losses typically increase in a quadratic manner with respect to distance, and because the images include fewer pixels as the distance to the motor vehicle increases. The derivation of the control variable and the lateral guidance can consequently be achieved precisely and/or in a resource-saving manner by means of, in particular also using, images from a single camera.

According to an example embodiment of the present invention, images of a roadway in the vicinity of the motor vehicle are recorded using the at least one camera of the motor vehicle. The roadway includes a traffic lane to be followed, which is projected in the images. In addition, a trajectory of the motor vehicle is determined in reference to the images on the basis of a self-motion estimate and projected onto the images. The trajectory is hereinafter also referred to as the travel trajectory. A control variable for lateral guidance of the motor vehicle is derived by comparing the traffic lane projected in the images with the travel trajectory projected onto the images.

Using the method according to the present invention, a projection of the traffic lane to be followed is performed directly onto the images, hence in a two-dimensional environmental model. Additional three-dimensional models, e.g., clothoids and the like, can be omitted as a result. Doing so enables the method to be performed in simplified and resource-saving manner. Moreover, it is possible in this way to depict the traffic lane in a straightforward manner, e.g., by splines, polygons, and the like. It is thus possible to reliably and easily take into account even more complex courses of the traffic lane.

When deriving the control variable, the traffic lane to be followed is advantageously considered to be the target state, and the travel trajectory is considered to be the actual state.

In the present case, "lateral guidance" is understood to mean guidance of the motor vehicle in a direction lateral to the direction of travel of the motor vehicle. Relevant in this regard are, in particular, lane center guidance, traffic lane keeping, in particular lane keeping assistance, and the like. In lane center guidance, the control variable is advantageously derived such that the motor vehicle travels along the middle of the traffic lane. When keeping the traffic lane, the control variable is advantageously such that the traffic lane is not departed from, in particular such that no lane markings are crossed.

The control variable can be any control variable having an impact on the lateral guidance of the motor vehicle, in particular one that causes a change to a curved travel path of the motor vehicle. The control variable is, e.g., a steering angle, steering speed, steering torque, or the like.

It is clear that control variable changes to the currently provided control variable fall under the term "derivation".

The method according to the present invention uses a known or previously determined traffic lane to be followed, as well as an extrinsic and known calibration of the at least one camera. In other words, both the known traffic lane and the extrinsic calibration of the at least one camera are assumed.

According to an example embodiment of the present invention, a mapping of the relative steering angle change to the change in distance in the images can be scaled by calibrating the at least one camera in relation to the motor vehicle. A relationship between the images and the environment, i.e., an image-world relationship, can then be depicted without explicit projections of the traffic lane into a coordinate system, in particular a global coordinate system. This particularly enables a speed-dependent and/or vehicle-specific derivation of the control variable to be performed.

The traffic lane can be determined in any manner.

Preferably, according to an example embodiment of the present invention, the traffic lane is determined based on the images from the at least camera, hence also within the native measurement space of the at least one camera, e.g., by means of detecting multiple gradient transitions. Features characterizing a traffic lane (hereinafter also referred to as road boundary features), can be extracted from the images for this purpose. Such road boundary features include, e.g., road markings, e.g., roadside markings, median markings, and the like. Road boundary features can also be guardrails and the like.

Alternatively or additionally, according to an example embodiment of the present invention, the traffic lane can be determined by means of determining a drivable surface (also known as "freespace") and/or by means of a geographic map and/or by means of semantic segmentation. The traffic lane can likewise be determined by comparison with the trajectories of other vehicles, a typical behavior at a predetermined location on the roadway, e.g., based on fleet data, being advantageously used for this purpose.

The self-motion estimate for determining the travel trajectory is preferably based on the images from the camera, thus being camera-based or image-based.

According to an example embodiment of the present invention, it is possible that a single lane model, in particular an Ackermann model and/or a ground plane estimate, be used to determine the travel trajectory. The travel trajectory is then determined, e.g., by means of an Ackermann model and a ground plane estimate, in which case the ground plane estimate can be noisy.

Alternatively or additionally, according to an example embodiment of the present invention, it is possible to determine a vanishing point of the self-motion estimate and to project it onto the images as a travel trajectory. The vanishing point is also referred to hereinafter as the trajectory vanishing point. In this context, at least one vanishing point from the traffic lane (hereinafter also referred to as a lane vanishing point) is also preferably determined and projected onto the images. The control variable can then be derived by comparing the trajectory vanishing point with the at least one lane vanishing point. It is in this case possible to perform such a vanishing point-based derivation of the control variable as an alternative to iterative projection by means of the single lane model, in particular the Ackermann model.

A single lane vanishing point can be used if the traffic lane to be followed has a straight course.

In contrast, if the lane is curved and/or has bends, preferably two or more lane vanishing points are used, in which case, for a plurality of points along the traffic lane, an associated lane vanishing point is in each case determined and projected onto the images. The control variable is in this case derived by a comparing the lane vanishing points with the trajectory vanishing point.

In advantageous embodiments of the present invention, the control variable is derived by a line-by-line comparison between the projected traffic lane and the projected travel trajectory.

Advantageous derivations of control variables result from the fact that various time constants regarding a collision between the traffic lane and the travel trajectory are determined based on the projected traffic lane and the projected travel trajectory. These time constants are also known to the person skilled in the art as "Time To Contact" (abbreviated as "TTC"). The control variable is in this case derived as a projection in the image for at least a portion of the various time constants, and thus for at least a portion of the TTCs.

In preferred embodiments of the present invention, the control variable is derived by a line-by-line comparison between the actual state and the target state, and thus advantageously by a line-by-line comparison between the travel trajectory projected onto the images as the actual state and the traffic lane projected onto the images as the target state. A change in the control variable for various time constants can in this case be derived as a projection in the image.

Determining a lateral time constant, i.e., a lateral TTC, using the optical flow enables the control variable in the native measurement space of the at least one camera, and therefore in the images, to be derived in a simple and reliable manner. In this way, it is in particular possible to derive a rate of change of the control variable in a simplified and/or direct manner. As a result, the intensity of lateral guidance intervention can be controlled in a simple manner.

The derived control variable advantageously depends upon the type of lateral guidance, as explained above.

In lane center guidance, improved lateral guidance can be achieved through a lateral TTC with respect to the edges of the traffic lane, in particular to the lane markings. The TTC can be used to, e.g., determine the traffic lane as a change in the control variable. To scale into global coordinates, it is then sufficient to use a locally sufficiently accurate plane model which travels along the traffic lane at uneven lateral speeds. The distance determined by means of the plane model makes it in particular possible to travel in the lane as centrally as possible with an infinite TTC.

It is understood that two or more control variables can also be derived using the method according to the present invention.

It is understood that the method is performed in an automated manner.

Preferably, the method is performed by means of a computer program product, e.g., an appropriately configured software or algorithm.

It is understood that such a computer program product is inherently within the scope of the present invention.

A computer system, in particular an appropriately configured computer program product, can be used to perform the method.

It is further understood that a motor vehicle in which the method is used is likewise within the scope of the present invention.

According to an example embodiment of the present invention, the motor vehicle comprises at least one camera, which in operation captures images of a roadway in the vicinity of the motor vehicle. The at least one camera is communicatively connected to a control device of the motor vehicle, with the control device being configured to perform the method.

The control device can at least partially contain and/or execute the computer program product. The control device can likewise at least partially contain or correspond to the computer system.

The motor vehicle can comprise a single camera of said kind, i.e., a mono camera.

The control variable is advantageously added to and/or provided in a driving assistance system used for driving assistance in the motor vehicle. The driving assistance system is preferably configured for at least partially autonomous driving of the motor vehicle. The driving assistance system in this case guides the vehicle laterally, depending on the control variable, in particular steering the motor vehicle.

Further important features and advantages of the present invention arise from the disclosure herein.

It is understood that the aforementioned features and the features yet to be explained hereinafter can be used not only in the respectively specified combination, but also in other combinations, or alone, without departing from the scope of the present invention.

Preferred embodiments of the present invention are illustrated in the drawings and explained in greater detail in the description below, in which similar reference signs refer to similar or functionally equal components.

DETAILED DESCRIPTION OF EXAMPLE EMBODIMENTS

Figure 1:
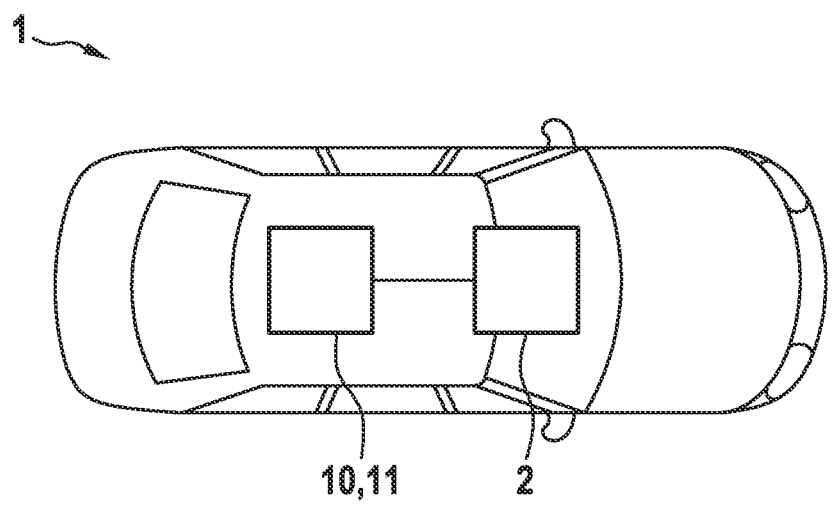
FIG. 1 shows a highly simplified top view of a motor vehicle having a camera, according to an example embodiment of the present invention.

For lateral guidance, e.g., for lane center guidance and/or for lane keeping in a motor vehicle 1, as shown by way of example in FIG. 1, images 3 (see FIG. 3) of an upcoming roadway 4 are recorded using at least one camera 2 of the motor vehicle 1, as indicated in FIG. 1. The images 3 are used to derive a control variable for lateral guidance of the motor vehicle 1, e.g., a steering angle and/or a steering torque, according to the following explanations.

In this context, the projections and derivations explained below are performed within the images 3. Compared to projections between the images 3 and a coordinate system, errors and accuracy losses caused by the transformations are therefore prevented or at least reduced. Doing so leads to a more precise derivation of the control variable, hence to a more precise lateral guidance of the motor vehicle 1. A traffic lane 5 to be followed as well as a known, extrinsic calibration of the at least one camera 2 are required for this purpose. In the exemplary embodiment shown in FIG. 1, the motor vehicle 1 features a single camera 2. The traffic lane 5 to be followed and the calibration of the camera 2 are presupposed in the following description.

Figure 2:
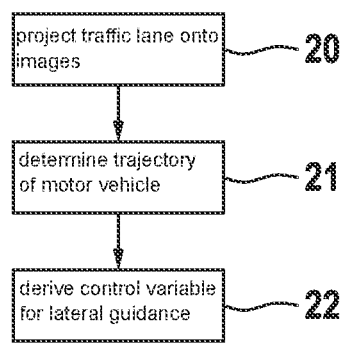
FIG. 2 shows a flow chart for deriving a control variable for lateral guidance of the motor vehicle, according to an example embodiment of the present invention.
Figure 3:
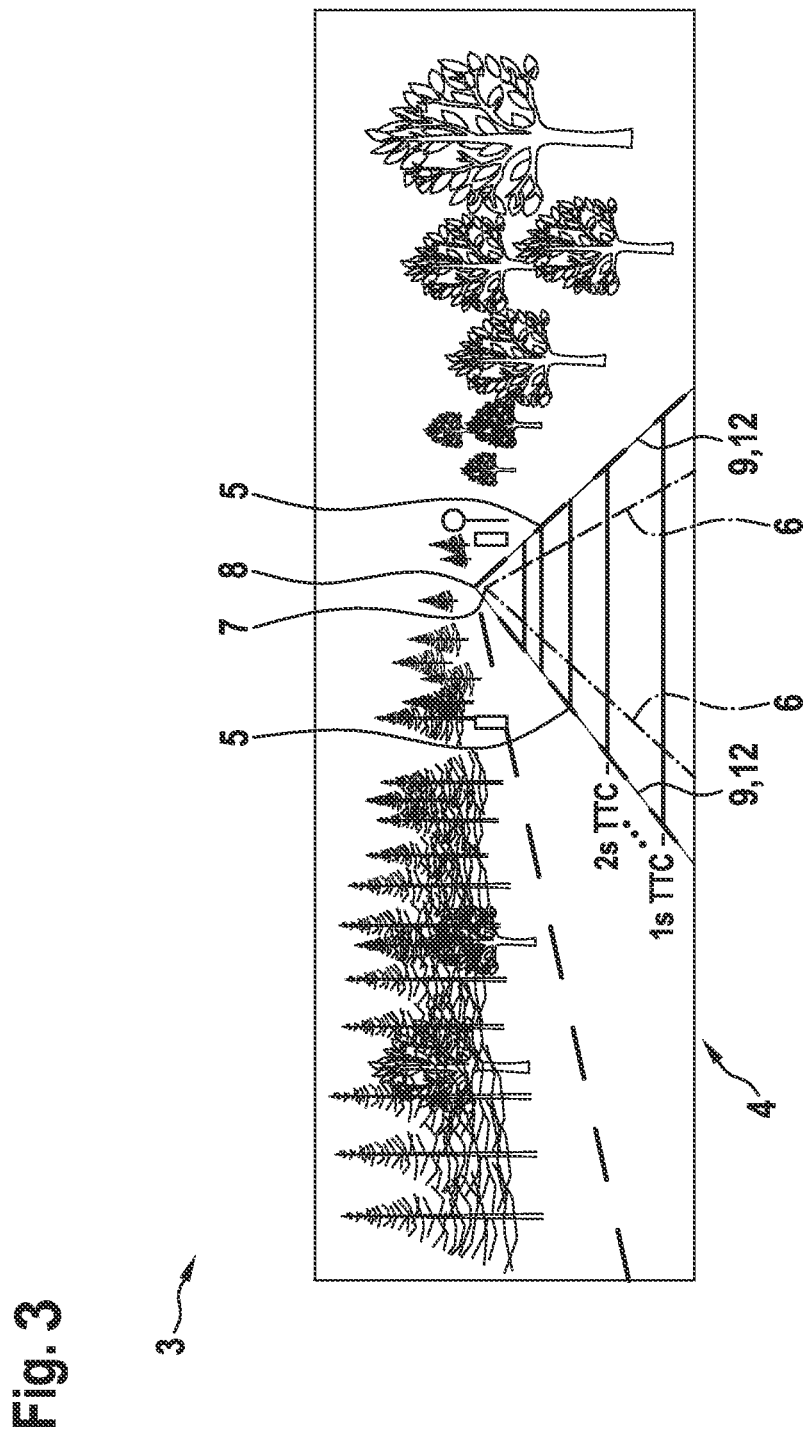
FIG. 3 shows an image captured by the camera.

According to FIG. 2, the traffic lane 5 to be followed along the roadway 4 is projected onto the images 3 during a method step 20. The method step 20 is also referred to hereinafter as the traffic lane projection step 20. In FIG. 3, the projection of the traffic lane 5 is shown in an image 3 from the camera 2. The projected traffic lane 5 is shown as unbroken lines. As shown in FIG. 3, the traffic lane 5 to be followed is bounded by, e.g., road boundary features 9, which in the exemplary embodiment shown are road markings 12. The road boundary features 9 are shown as dashed lines in FIG. 3. In addition, during a method step 21 as shown in FIG. 2, a trajectory 6 of the motor vehicle 1 is determined in reference to the images 3 on the basis of a self-motion estimate and projected onto the images 3. This trajectory 6 is also hereinafter referred to as the travel trajectory 6. The travel trajectory 6 is shown as lines of alternating dots and dashes in FIG. 3. The method step 21 is also referred to hereinafter as the travel trajectory step 21. The self-motion estimate is advantageously camera-based and/or image-based. In a subsequent method step 22, the control variable for lateral guidance of the motor vehicle 1 is derived based on a comparison between the traffic lane 5 projected onto the images and the travel trajectory 6 projected onto the images. The method step 22 is also referred to hereinafter as the derivation step 22. In the derivation step 22, the traffic lane 5 corresponds in this case to the target state of lateral guidance, and the travel trajectory 6 corresponds to the actual state of lateral guidance.

In the flow chart shown in FIG. 2, it is assumed that the travel trajectory step 21 is performed after the traffic lane projection step 20. Of course, these method steps 20, 21 can also be performed in reverse order, or at the same time.

Determination of the travel trajectory 6 can be determined by means of an Ackermann model and a ground plane estimate. The travel trajectory 6 thus determined is then projected onto the images 3 during the travel trajectory step 21. The travel trajectory step 21 can in this case also include determining the travel trajectory 6

To derive the control variable (hence during the derivation step 22), various time constants regarding a collision between the travel lane 5 and the travel trajectory 6 can be determined based on the projected traffic lane 5 and the projected travel trajectory 6. These time constants are also known to the person skilled in the art as "Time To Contact" (abbreviated as "TTC") and are indicated as "TTC" in FIG. 3. As indicated in FIG. 3, the control variable can in this case be derived as a projection in image 3 for at least a portion of the various time constants. Said derivation is advantageously performed by means of a line-by-line comparison between the projected traffic lane 5 and the projected travel trajectory 6, the corresponding lines in FIG. 3 being indicated by transverse and parallel lines. Accordingly, the control variable is advantageously derived by means of a line-by-line comparison between the projected traffic lane 5 and the projected travel trajectory 6. In other words, the control variable can be derived by means of a line-by-line comparison between the actual state and the target state. The change in the control variable can be determined for various time constants as a projection onto the images 3 in order to determine a correspondingly suitable control variable, or a change of control variable.

Alternatively or additionally, it is possible that a vanishing point-based approach be used to derive the control variable. For this purpose, according to FIG. 3, a vanishing point 7 for the self-movement of the motor vehicle 1 (hereinafter also referred to as a trajectory vanishing point 7), as well as at least one vanishing point 8 of the traffic lane 5 to be followed (hereinafter also referred to as a lane vanishing point 8), is projected onto the images 3. More specifically, during the travel trajectory step 21, the trajectory vanishing point 7 is determined based on the self-movement of the motor vehicle 1 and projected onto the images 3. In addition, at least one lane vanishing point 8 is the traffic lane 5 is determined and projected onto the images 3. Alternatively or additionally, during the traffic lane projection step 20, at least one lane vanishing point 8 can be determined and projected onto the images 3. The control variable is in this case derived by comparing the vanishing points 7, 8. In other words, during the derivation step 22, the control variable is determined by comparing the trajectory vanishing point 7 with the at least one lane vanishing point 8. In the exemplary embodiment shown in FIG. 3, a straight traffic lane 5 is shown. The use of a single lane vanishing point 8 is thus sufficient. In contrast, if the traffic lane 5 is curved and/or has bends (not shown), it is advantageous for several points along the traffic lane 5 to respectively determine an associated lane vanishing point 8, and for the control variable to be derived by comparing the lane vanishing points 8 with the trajectory vanishing point 7.

It is possible that the traffic lane 5 be determined from the images 3 from the camera 2. Doing so has the advantage that the required steps are performed in the images 3. This results in a further reduction of possible errors and/or inaccuracies. In other words, the traffic lane 5 to be followed is extracted and thus determined from the images 3, e.g., by means of the road boundary features 9. However, it is also alternatively or additionally possible that the traffic lane 5 to be followed be determined by means of determining a drivable surface and/or by means of a geographic map and/or by means of semantic segmentation and/or by comparison with the trajectories of other vehicles.

It is understood that the method steps 20, 21, 22 will be repeated continuously in order to achieve an appropriate and continuous derivation of the control variable.

The method is performed in an automated manner and, advantageously, by means of a computer program product, e.g., an appropriately configured software and/or algorithm.

In order to perform the method, the motor vehicle 1 comprises a control device 10 as indicated in FIG. 1, which is communicatively connected to the camera 2 and configured accordingly. In this context, the control device 10 can comprise a computer system 11, in particular the computer program product, which is configured to perform the method.

Although only one control variable for lateral guidance of the vehicle 1 has been addressed in the foregoing description of the figures, it is to be understood that two or more control variables can also be derived using the method. It is further understood that deriving the control variable also includes changes to an existing and/or provided control variable.

The at least one derived control variable is in this case provided to a driving assistance system of the motor vehicle 1 (not shown). The driving assistance system is preferably able to drive, in particular steer, the motor vehicle 1 at least partially autonomously.

What is claimed is:

1. A method for a motor vehicle performed using images of a roadway captured by at least one camera of the motor vehicle, the method comprising the following steps:
   projecting a traffic lane of the roadway to be followed onto the images;
   determining a travel trajectory of the motor vehicle in reference to the images based on a self-motion estimate;
   projecting the determined travel trajectory onto the images;
   deriving a control variable from a comparison between the traffic lane projected onto the images and the determined travel trajectory projected onto the images; and
   controlling a lateral guidance of the motor vehicle based on the derived control variable.

2. The method according to claim 1, wherein the travel trajectory is determined using a single lane model and a ground plane estimate, the single lane model including an Ackermann model.

3. The method according to claim 1, further comprising:
   determining various time values for a collision between the traffic lane and the travel trajectory from the projected traffic lane and the projected travel trajectory, the control variable being derived as a projection in the images for at least a portion of the various time values.

4. The method according to claim 1, wherein the control variable is derived by a line-by-line comparison between the projected traffic lane and the projected travel trajectory.

5. The method according to claim 1, wherein:
   the determined travel trajectory that is projected onto the images is a trajectory vanishing point of the self-motion estimate;
   the traffic lane that is projected on the images is represented as at least one lane vanishing point of the traffic lane; and
   the comparison by which the control variable is derived is made by comparing the trajectory vanishing point and the at least one lane vanishing point.

6. The method according to claim 5, wherein:
   the traffic lane is curved;
   the at least one lane vanishing point includes a respective associated lane vanishing point for each of a plurality of points along the traffic lane; and
   the comparison by which the control variable is derived is made by comparing the respective associated lane vanishing points with the trajectory vanishing point.

7. The method according to claim 1, wherein the traffic lane to be followed is determined from the images using road boundary features.

8. The method according to claim 1, wherein the traffic lane to be followed is determined by determining a drivable surface and/or using a geographic map and/or using semantic segmentation and/or by a comparison with trajectories of other vehicles.

9. A non-transitory computer-readable storage medium on which is stored a computer program that is executable by a computer or control device and that, when executed by the computer or control device, causes the computer or control device to perform a method for a motor vehicle, the method being performed using images of a roadway captured by at least one camera of the motor vehicle, the method comprising the following steps:
   projecting a traffic lane of the roadway to be followed onto the images;
   determining a travel trajectory of the motor vehicle in reference to the images based on a self-motion estimate;
   projecting the determined travel trajectory onto the images;
   deriving a control variable from a comparison between the traffic lane projected onto the images and the determined travel trajectory projected onto the images; and
   controlling a lateral guidance of the motor vehicle based on the derived control variable.

10. A motor vehicle, comprising:
    at least one camera which, during operation, captures images of a roadway; and
    a control device communicatively connected to the at least one camera, wherein the control device is configured to:

project a traffic lane of the roadway to be followed onto the images;
determine a travel trajectory of the motor vehicle in reference to the images based on a self-motion estimate;
project the determined travel trajectory onto the images;
derive a control variable from a comparison between the traffic lane projected onto the images and the determined travel trajectory projected onto the images; and
control a lateral guidance of the motor vehicle based on the derived control variable.

* * * * *